Figure 1:
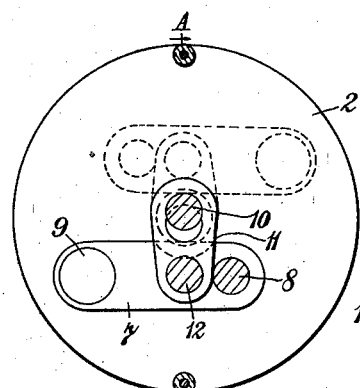

July 13, 1937.    F. R. BANNING-LOVER    2,087,060

POWER TRANSMITTING AND CHANGE SPEED APPARATUS

Filed Jan. 17, 1936    5 Sheets-Sheet 1

F. R. Banning-Lover
INVENTOR

By: Glascock Downing Weebold
Attys.

July 13, 1937.  F. R. BANNING-LOVER  2,087,060
POWER TRANSMITTING AND CHANGE SPEED APPARATUS
Filed Jan. 17, 1936   5 Sheets-Sheet 2

F. R. Banning-Lover
Inventor

By: Glascock Downing Seebold
Attys.

July 13, 1937.  F. R. BANNING-LOVER  2,087,060
POWER TRANSMITTING AND CHANGE SPEED APPARATUS
Filed Jan. 17, 1936  5 Sheets-Sheet 4

F. R. Banning-Lover
INVENTOR

By: Glascock Downing Seeby
Attys.

July 13, 1937.  F. R. BANNING-LOVER  2,087,060
POWER TRANSMITTING AND CHANGE SPEED APPARATUS
Filed Jan. 17, 1936  5 Sheets-Sheet 5

F. R. Banning-Lover
INVENTOR

By: Glascock Downing Seebold
Attys.

Patented July 13, 1937

2,087,060

UNITED STATES PATENT OFFICE 2,087,060

POWER TRANSMITTING AND CHANGE SPEED APPARATUS

Frederick Richard Banning-Lover, Colpetty, Colombo, Ceylon

Application January 17, 1936, Serial No. 59,632
In Great Britain July 17, 1934

4 Claims. (Cl. 74—64)

This invention relates to automatic power transmitting change speed apparatus, more particularly of the kind in which the inertia of an oscillatable mass or masses is/are employed to enable a variable drive to take place.

Numerous mechanisms of this type have been devised without satisfactory results due to the fact that when there is relative movement, due to load, between the driving and the driven members, the action and the reaction of the inertia masses have always been equal and opposite in their effect upon the driven point; resulting therefore in the net energy transmitted from the driving to the driven member being zero; and though various devices in the form of ratchets, freewheels, etc. have been incorporated with a view to their functioning as torque reaction members to accept and absorb this adverse torque reaction, the results were still unsatisfactory.

Mechanisms handicapped by this equal and opposite torque reaction therefor function purely as couplings; and that only at high engine speeds and rather harshly if there is anything of a load to be contended with; there is absolutely no gradual building up of the torque and without which feature such mechanisms of this kind cannot function as torque convertors.

The improved apparatus is primarily intended to replace the gear box and clutch mechanism on motor cars and machinery of various descriptions where a range of transmission speeds is desired. The apparatus thus has the advantage of a combined clutch which enables the disengagement of the transmission from the power source when the speed of the latter is reduced, such as arises when the motor of a road car is idling. A further feature is that a freewheeling or neutral position is obtained similar to that when the motor of a car on the run is slowed down and the transmission from the motor or power units is disengaged, either when the latter is idling or at rest. This free wheeling though dependent upon the speed of the vehicle first provides a braking action that is equal on the transmission road wheels owing to the inertia masses now being operated by the transmission.

According to the present invention the fundamental requirement of the torque reaction member or element to accept and absorb adverse torque, is definitely provided for, and it is inherent in the fact that the inertia masses are radially mounted on pins on the driving member and, the pivoting of these unbalanced weights on fulcra, for such is also a function of the pulling pins or bolts having eccentric movement in relation to the driven point away from on the one side and on which side there is definite action or a torque on the driven member, and closer to on the other side where there is equally definitely, and due to the synchronous travel of the weights and their fulcra, no adverse torque or reaction on the driven member in the opposite direction, these facts together with the flexibility of the connections or linkage provide a most flexible and effective means of building up and transmitting torque from the driving to the driven member.

It is only when the load has been overcome and there is no relative movement between the driving and the driven member, that the inertia masses exert equal and opposite pressure on the driven point; and thus provide the locked or "top" gear.

The invention consists in a power transmitting and change speed device of the kind just described in which the action and reaction of an inertia mass or masses are not equal and opposite in their effect upon a driven point such as the crank of the driven member, unbalanced inertia mass or masses being radially mounted and directly pivoted to a power transmitting disc so that their fulcra have an eccentric movement around the driven point while the linkage means connecting the inertia mass or masses with the driven point rotate the latter by periodic impulses due to the varying leverage which is dependent upon the angularity of the linkage in relation to the unbalanced masses and their fulcra and also the driven points.

Several modifications of the invention will now be described with reference to the accompanying drawings which are given by way of examples. In these drawings:—

Figure 2:
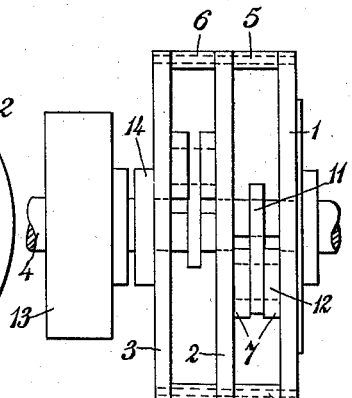
Figure 6:
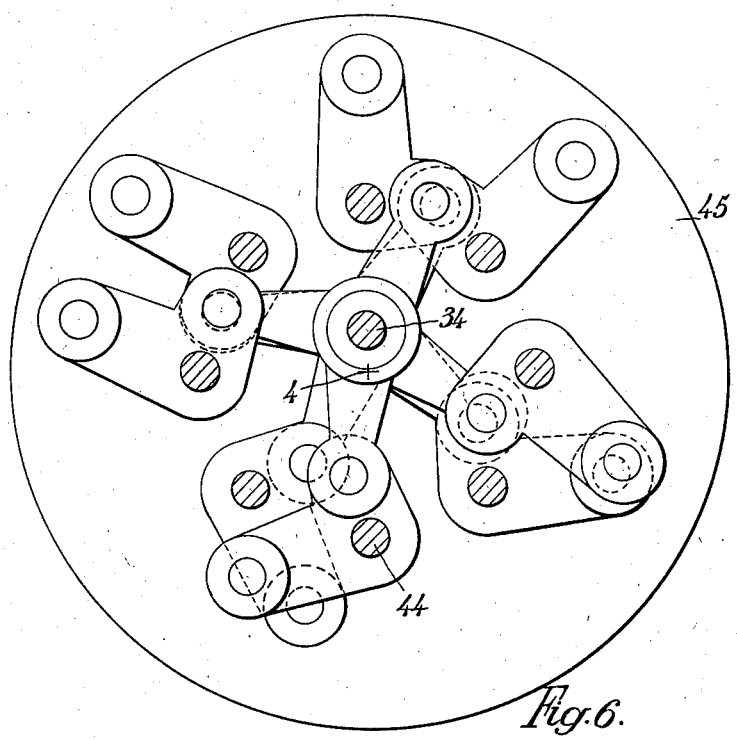
Figure 7:
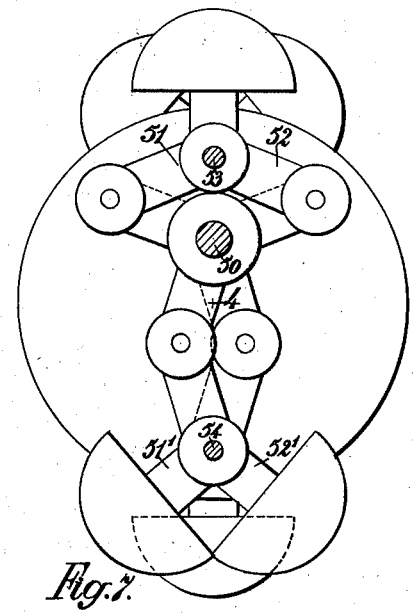
Figure 3:
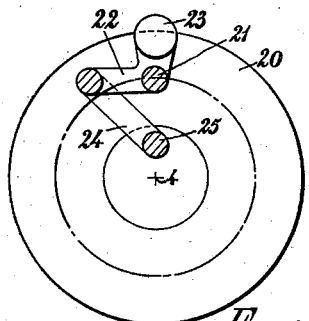
Figure 8:
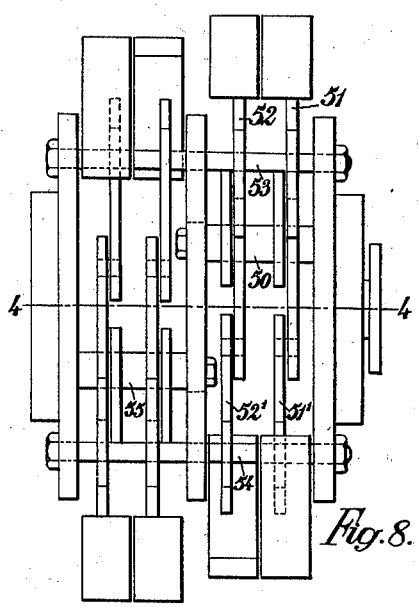
Figure 4:
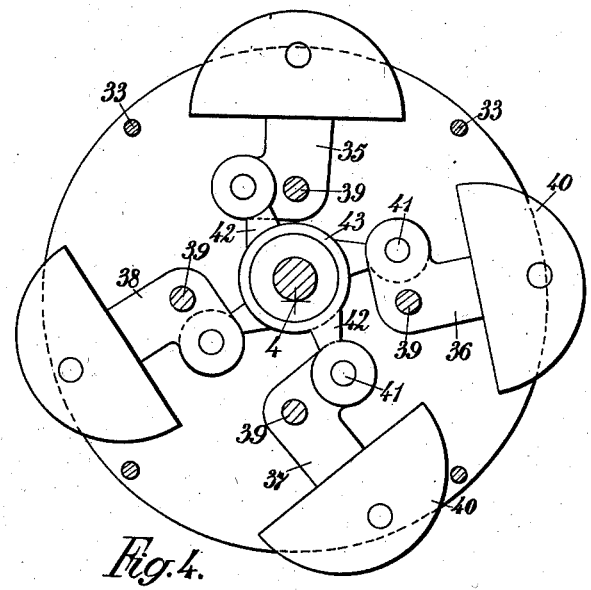
Figure 5:
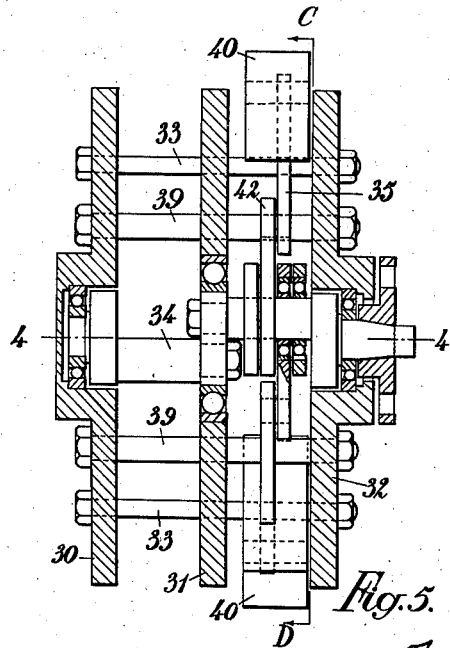
Figure 9:
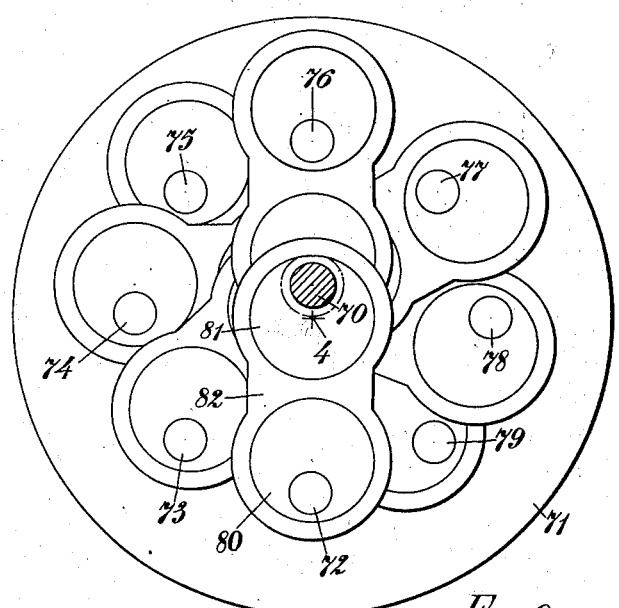
Figure 10:
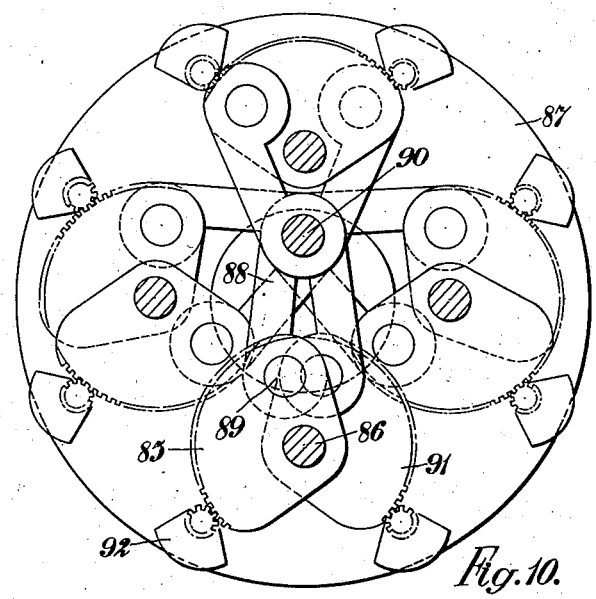
Figure 11:
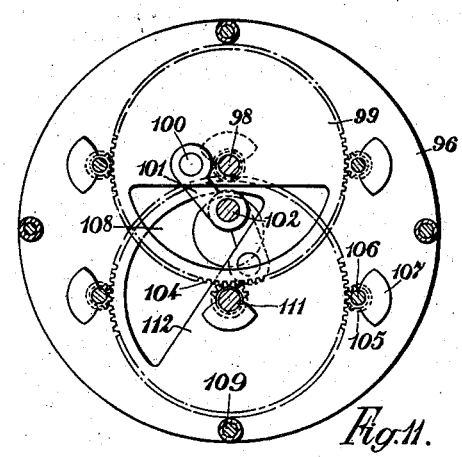
Figure 12:
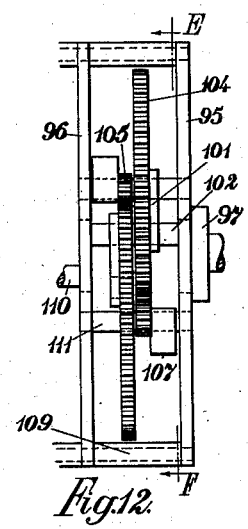
Figure 13:
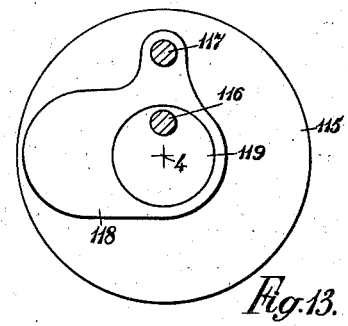
Figure 14:
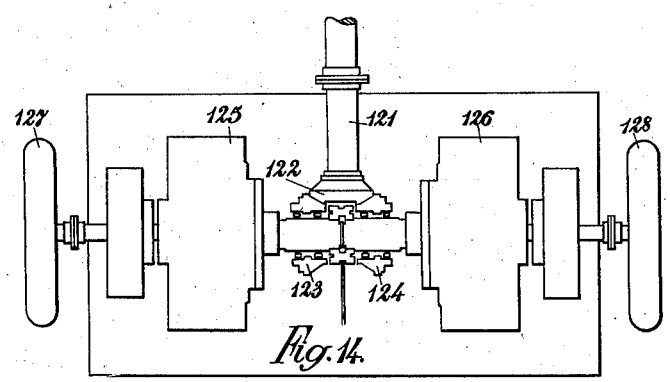

Figure 1 shows in sectional elevation a simple form of the improved power transmission device, Figure 2 is a cross section of Figure 1 on line A—B, Figure 3 shows in schematic form a side view of a modified arrangement of the levers and links, Figure 4 shows in side elevation a constructive arrangement of that shown in Figure 3, Figure 5 is an end elevation of Figure 4 with the device comprised in two bays, Figure 6 shows a side elevation with a number of actuating members in each bay, Figure 7 is a side view of a further modification, Figure 8 is an end view of the device shown in Figure 7, Figure 9 shows in side elevation a further modification of the device, Figure 10 shows in side elevation still another construction of the device, Figure 11 shows a further modification of the device taken on the line E—F of Figure 12, Figure 12 is a part side elevation of the arrangement in Figure 11, Figure 13 shows in schematic form a simplified construction of the device, and Figure 14 shows schematically in plan an application of the device to a motor car.

Referring to Figures 1 and 2 of the drawings which illustrate the invention in a simple form, 1 is a disc adapted to be driven continuously from a source of power, and 4 is the driven shaft. 2 and 3 are discs similar to disc 1 and which may be secured together at intervals near their peripheries by distance pieces 5 through which securing bolts 6 are passed. The driven shaft 4 is arranged coaxially of the discs 1, 2 and 3 and extends through same and has two oppositely disposed throws, ball bearings preferably being fitted to reduce friction. The drive to the driven shaft 4 is shown, in this example, in duplicate, which provides for balance of the rotating parts, but in practice multiple sets ensure a more even transmission of power to the driven shaft during rotation of the device.

Taking one half of the arrangement which is mounted say, between discs 1 and 2, 7 are two levers pivoted at 8 to the said discs and having at their opposite ends a weight or weights 9. Upon the driven shaft 4 is a crank 10; a sheave 11 in the form of a link fits upon the crank and is pivoted to lever 7 at 12, a point between pivot 8 and the weight 9. As already stated, a similar pair of actuating members is provided between discs 2 and 3, these being mounted at diagonally opposite positions to the members mounted between discs 1 and 2, whereby balance of the rotatable parts is obtained when in use. Preferably a flywheel 13 may be keyed to the driven shaft and a clutch means 14 may be fitted between the flywheel and the driving disc 3 so that a direct or solid drive may be obtained when desired.

The operation of the device when working under normal conditions, considering one element only, is as follows: Upon starting up, the driving member rotates upon its axis carrying with it levers 7, and as axle 4 remains stationary these levers reciprocate about their pivots 8 due to the rotation of link 11 upon the crank 10. At a certain speed, determined by the weight 9 and the constructive dimensions, the centrifugal force is such as to enable the link 11 to grip the crank 10 for a small angular distance during its rotation where the leverage due to the throw of the crank and the eccentric travel of the pivots 12 in relation to the said crank is most favorable for the purpose. At full speed and with a light load the grip may become a continuous one and thus a direct transmission is effected. As, however, in practice, intermittent impulses only occur at the early stages of transmission, it becomes necessary to provide multiple weighted lever and linkage elements, whereby the torque upon the driven shaft is rendered nearly or completely continuous. It will be understood from the above that the varying leverages—through the medium of the travel of the fulcrum away from, on the one side and closer to on the other side towards the driven point also the angularity of the linkage in relation to the weighted lever and its pivot also the driven point produce a definite unbalanced torque.

In a modification of the transmission device shown schematically in Figure 3, 20 represents a driving disc upon which is pivoted at 21 a bell-crank lever 22 having a weight 23 mounted on one of the arms and a link 24 which is articulated to the other arm and to the crank pin 25. The axes of the driving disc and of the crank shaft are coaxial at 4. As the driving disc rotates anti-clockwise carrying with it the bell-crank lever and the crank shaft remaining stationary, the weight is caused to reciprocate about the pivot 21 due to the rotation of link 24 upon the crank pin 25. The energy produced by the reciprocating weight is periodically absorbed and given up but as the speed increases, a torque is obtained upon the crank which is sufficient to commence rotating the crank around the axis 4, the angular period increasing as the speed accelerates until a steady impulse is arrived at.

A development of the schematic arrangement indicated by Figure 3 is shown in Figures 4 and 5 in which 30 is a disc adapted to be secured to a driving means, 31 and 32 being additional discs forming two bays within which the actuating elements are fitted. Figure 4 is a view on line C—D of Figure 5 and shows the bay between discs 31 and 32 with a set of the elements in position. The discs may be secured together by bolts 33 arranged near the peripheries of the discs or by the pivot pins that extend through the discs or by any other suitable means. The axis of the crank shaft 4 of the device is coaxial with that of the driven crank shaft, the off-set of the cranks being the distance between 4 and 34. There are four bell-crank arms 35, 36, 37 and 38, each mounted on a pivot 39 passing through the three discs, the outer ends of the arms carrying weights 40 and the inner ends being articulated by pins 41 to links 42 each of which terminates in an annulus 43 that takes its bearing upon the crank pin. The action of the weights during the operation of the device is to reciprocate upon the pins 39 as they are carried around the crank pin, whereby the pull on the links 42 successively acts upon the crank, due to the energy stored in the weights, at the portions of the rotation where the leverages are favorable. All the impulses gradually decreasing as the angle becomes obtuse, that is, the angle is acute at the most favorable pulling position as occupied by the lever 35 and the force on the driven point gradually dies away as the angle becomes obtuse, the most ineffective position being as indicated by 37; thus producing a more or less continuous torque which results in a continuous rotation of driven crank shaft 4. The rotating parts are provided with ball bearings as shown to reduce friction and these or any other type of friction reducing bearings may be employed throughout. It will be understood that upon a change of condition, as for instance, when the device is fitted to a motor car and the latter commences to ascend a hill at a given engine speed, the impulse torque is less as a result of the increased load without any increase of engine speed, and slowing up of the speed of the car on the road, automatically takes place. Conversely, when the incline of the road lessens, the torque on the crank shaft is increased and therefore the speed of the motor car accelerates.

In Figure 6 an example of the device is shown in cross-section in which 4 is the main axis and 34 the off-set of one crank pin. There are eight weighted actuating elements indicated, each mounted on a separate pivot 44 which passes through disc 45, these pivot pins being secured to other discs as in the former example. The inner ends of the bell-crank levers are articulated to separate links, each of which terminates in an annulus that fits loosely upon the crank pin, the operation being similar to that already described. Preferably, another set of eight actuating members are mounted in the same bay as those shown and upon the same pivot pins 44 but they each transmit their movement to separate annuli fitted upon the crank pin, whereby it will be understood that individual impulses are transmitted to the crank during each revolution of the latter. Further, with a second bay there can be mounted upon extensions of the said pivot pins a further set of sixteen actuating members, the links of which are all connected separately to a crank pin in each bay, so that as the device rotates, the intermittent impulses become practically continuous and an even torque thereby created, which can take effect in a clockwise or anti-clockwise direction.

A further modified form of the device is seen in Figures 7 and 8. In this example, 4 is the main axis and 50 the crank pin. There are four bell-crank levers 51, 52, 51¹, 52¹ mounted two on each pivot 53, 54, and the inner ends of the crank arms are articulated to links each of which terminate in an annulus or bush that fits loosely upon the crank 50. The arrangement provides a locking arrangement in which the impulses are distributed during the rotation of the device. A second set of actuating members, if desired, may be fitted in the same bay at right-angles to the first set, and a complete duplicate may be fitted within a second bay and connected with a separate crank 55 as seen on the left of Figure 8 and in the manner already described, whereby a more even balance of the actuating members is obtained.

Figure 9 shows a modified construction of the device in which 4 is the main axis and 70 the crank pin. 71 is the disc upon which are mounted 8 pivot pins 72 to 79. These pins each carry a lever in the form of an unbalanced weight, one of these being indicated by the cylindrical weight 80. There is also loosely mounted upon the crank pin 70 a similarly off-set link 81 and the said two elements are connected by another link member 82 which is mounted loosely thereon. The remaining seven pivoted weights—as weight 88—are connected in a similar manner to the crank pin 70 and as the whole device rotates, each link acting through its pivoted weights effects a pull upon the crank where its leverage upon the crank pin is at the best advantage during rotation. Another set of the actuating members may be provided in a separate bay and the benefit of a nearly even torque throughout the cycle.

The weight and linkage members are preferably mounted upon the pivot pins and the crank pin by means of needle rollers, this form of bearing being also fitted between the weights and the links but for the sake of clearness in the drawings single lines only are shown.

In the modification shown in Figure 10, the bell-crank levers are comprised of unbalanced weights, one of which is represented by 85. This weight is pivoted on the pin 86 secured to the driving disc 87 and a link 88 is articulated at one end to the weight at 89 and at the other end to the crank pin 90. There are two of the weights as 85 pivoted upon each pivot, for example 85 and 91 and with four pivot pins as 86, there are therefore eight links, all of which act independently upon a crank pin.

In addition to the reciprocating actions of the pivoted unbalanced weights 85, which provide the torque impulses to the driven crank shaft, additional weights as 92, may be provided to enhance this action. For this purpose a portion of the peripheral surface of the weights 85 are made as a quadrant struck from the pivot pins and each is provided with teeth that engage with a pinion integral with a weight so that as the weight 85 reciprocates the energy in the weight 92 becomes absorbed in the actuating member to give the desired torque impulses to the crank pin, and this action is constantly repeated during the rotation of the device.

A still further modification of the device is shown in Figures 11 and 12, in which one bay is constituted between discs 95 and 96 that are secured to the driving shaft 97. Upon the inner side of the disc 95 is pivoted at 98 an unbalanced wheel 99 to which at 100 is articulated a link 101 which fits loosely upon a crank 102 upon the driven shaft. The impulse action of the link upon the driven shaft is accentuated in the following manner. The unbalanced wheel 99 is provided with teeth 104 on a portion or the whole of the periphery which gear with a pinion 105 loosely mounted upon a pin 106 which is secured to the disc 95. Integral with the pinion 105 or bolted thereto, is an unbalanced weight 107, which is therefore reciprocated during the rotation of the driving disc to an angular extent depending upon the throw of the crank and the gearing ratio of the toothed wheels. It will be observed that the toothed wheel 99 is provided with an opening 108 to allow the crank shaft to pass therethrough with clearance for the reciprocation of the toothed wheel. A duplicate of this arrangement is also connected with the said crank 102 at a diagonal position and this provides for additional impulses during the rotation of the device. The discs 95 and 96 are held together by bolts and distance pieces as at 109 and these can be extended to form with another driving disc a second bay. In this second bay there will be fitted a second duplicate set of the driving means as already described, but these are placed diagonally to the first mentioned duplicate set and connected with a second crank 110 that is diagonally opposed to crank 102. Any suitable number of weighted elements similar to 107 may be provided as indicated, one of these being shown integral with a pinion 111 which forms the pivot that carries the second wheel 112.

Figure 13 shows a still further form of the invention.

In this arrangement 115 represents the driving disc and 116 the crank pin having the throw of 4—116. A pivot 117 secured to the driving disc carries a shaped member 118 non-centrally disposed with respect to the main axis 4. The weighted member 118 loosely fits upon the eccentric 119 forming a sheave which rotates around the eccentric (which latter is also loosely mounted upon the crank 116), before the centrifugal action of the weight is sufficient to transmit power to the driven shaft. It will be seen that the action of this device is similar to that of the other arrangements and that it only requires additional actuating elements spaced at suitable intervals around the disc or discs to obtain a succession of torque impulses during each rotation of the driving shaft.

The foregoing examples may obviously be extended while keeping within the scope of the invention, but those described comprise preferred constructions that have given in practice satisfactory results.

The invention is adapted for all forms of power transmission, and is particularly serviceable in motor car propulsion. An example of the latter is shown in Figure 15 which is a plan view of the back axle arrangement. The drive from the engine is transmitted through the shaft 121 to a bevel wheel 122 and thence to two bevel crown wheels 123 and 124 which are loosely mounted upon a transverse shaft and revolve in opposite directions, the shaft carrying the two devices and having a sliding dog operated by a lever for engaging with either of the crown wheels in order to afford forward and reverse propulsion. 125 and 126 are the improved power transmission devices through which the rear wheels 127 and 128 are driven. The arrangement avoids the use of a change speed gear and eliminates the differential, thereby providing an economic drive that automatically controls the speed of the vehicle upon the level and on gradients.

While various constructions of the improved power transmitting and change speed apparatus have been described above, in their essentials, it will be understood that other arrangements of parts and details can be introduced in their design that are within the ambit of the invention as set forth in the following claims.

In the drawings, separate cranks are shown in separate bays but the provision of one or more intermediate discs is only a matter of strength in design.

Further, it will be obvious that details such as ball or roller or other types of bearings may be embodied in a manner that best suits the particular design.

I claim:

1. An automatic variable speed torque converter comprising a driving pisc. pivots on said disc arranged at equal radial distances from the axis thereof, unbalanced weights mounted on said pivots, a driven shaft coaxial with the driving disc, a crank and crank pin rigid with the driven shaft and links, each of which connects the crank pin with one of the weights at such a point that during rotation of the driving disc, and before the converter rotates as a unit, the weight has an oscillating motion in which it avoids passing across the centre line of the driving and driven members, the eccentric movement of the pivots around the crank pin causing the links to produce successive impulses which drive the crank continuously in one direction.

2. An automatic variable speed torque converter as claimed in claim 1 comprising a driving disc, pivots on said disc arranged at equal radial distances from the axis thereof, two similar unbalanced weights mounted on each of said pivots, a crank shaft coaxial with the axis of the driving disc, a crank pin rigid with the driven shaft, and links connected, by one end, to one of the pairs of weights that are mounted on the same pivot with the other ends connected to the crank pin whereby a more even drive of the driven shaft is obtained.

3. An automatic variable speed torque converter as claimed in claim 1 comprising a driving disc, pivots disposed on opposite sides of the axis thereof, unbalanced wheels mounted on their centres upon said pivots and having apertures through which the crank pin passes, pivots arranged on each of said weights and links connecting the last mentioned pivots to the crank pin, whereby a more even drive of the driven shaft is obtained.

4. An automatic variable speed torque converter comprising at least one driving disc mounted on a driving shaft, pivots on each disc arranged at equal radial distances from the axis thereof, bell-crank levers mounted on said pivots, a weight mounted on one arm of each bell-crank lever, a driven shaft coaxial with the driving shaft, a crank pin for each driving disc rigid with the driven shaft and links each of which connects the associated crank pin with the second arm of the bell-crank lever, the connecting point of said link, pivot and centre of gravity of the weight being arranged at the apices of a triangle so that during rotation of the driving disc and before the converter acts as a unit, the weight has an oscillating motion in which it avoids passing across the centre line of the driving and driven shafts, the eccentric movement of the pivots around the crank pin causing the links through their varrying angularity to produce successive impulses which drive the crank continuously in one direction.

FREDERICK RICHARD BANNING-LOVER.